United States Patent [19]

Piper et al.

[11] 4,075,532

[45] Feb. 21, 1978

[54] COOL-WHITE FLUORESCENT LAMP WITH PHOSPHOR HAVING MODIFIED SPECTRAL ENERGY DISTRIBUTION TO IMPROVE LUMINOSITY THEREOF

[75] Inventors: William W. Piper, Scotia; Jerome S. Prener, Schenectady, both of N.Y.; George R. Gillooly, Cleveland Heights, Ohio

[73] Assignee: General Electric Company, Schenectady, N.Y.

[21] Appl. No.: 695,934

[22] Filed: June 14, 1976

[51] Int. Cl.² ............... H01J 61/44; C09K 11/12; C09K 11/24; C09K 11/42
[52] U.S. Cl. ............... 313/497; 252/301.4 P
[58] Field of Search ............... 313/487; 252/301.4 P

[56] References Cited

U.S. PATENT DOCUMENTS

| | | | |
|---|---|---|---|
| 2,030,402 | 2/1936 | Ruttenauer | 313/487 |
| 3,630,947 | 12/1971 | Brixner | 252/301.4 P |
| 3,670,194 | 6/1972 | Thornton, Jr. et al. | 252/301.4 P |
| 3,748,517 | 7/1973 | Haft | 313/487 |
| 3,764,555 | 10/1973 | Vincent et al. | 252/301.4 P X |

*Primary Examiner*—Palmer C. Demeo
*Attorney, Agent, or Firm*—John F. McDevitt; Lawrence R. Kempton; Frank L. Neuhauser

[57] ABSTRACT

An improved cool-white fluorescent lamp utilizes a particular two-component phosphor combination exhibiting a narrow "blue" emission spectrum and a broad "yellow" emission spectrum to achieve improved luminous efficacy. In one preferred embodiment, the combination is a blended mixture of europium activated strontium chlorapatite with manganese and antimony coactivated calcium fluorapatite phosphors.

8 Claims, 4 Drawing Figures

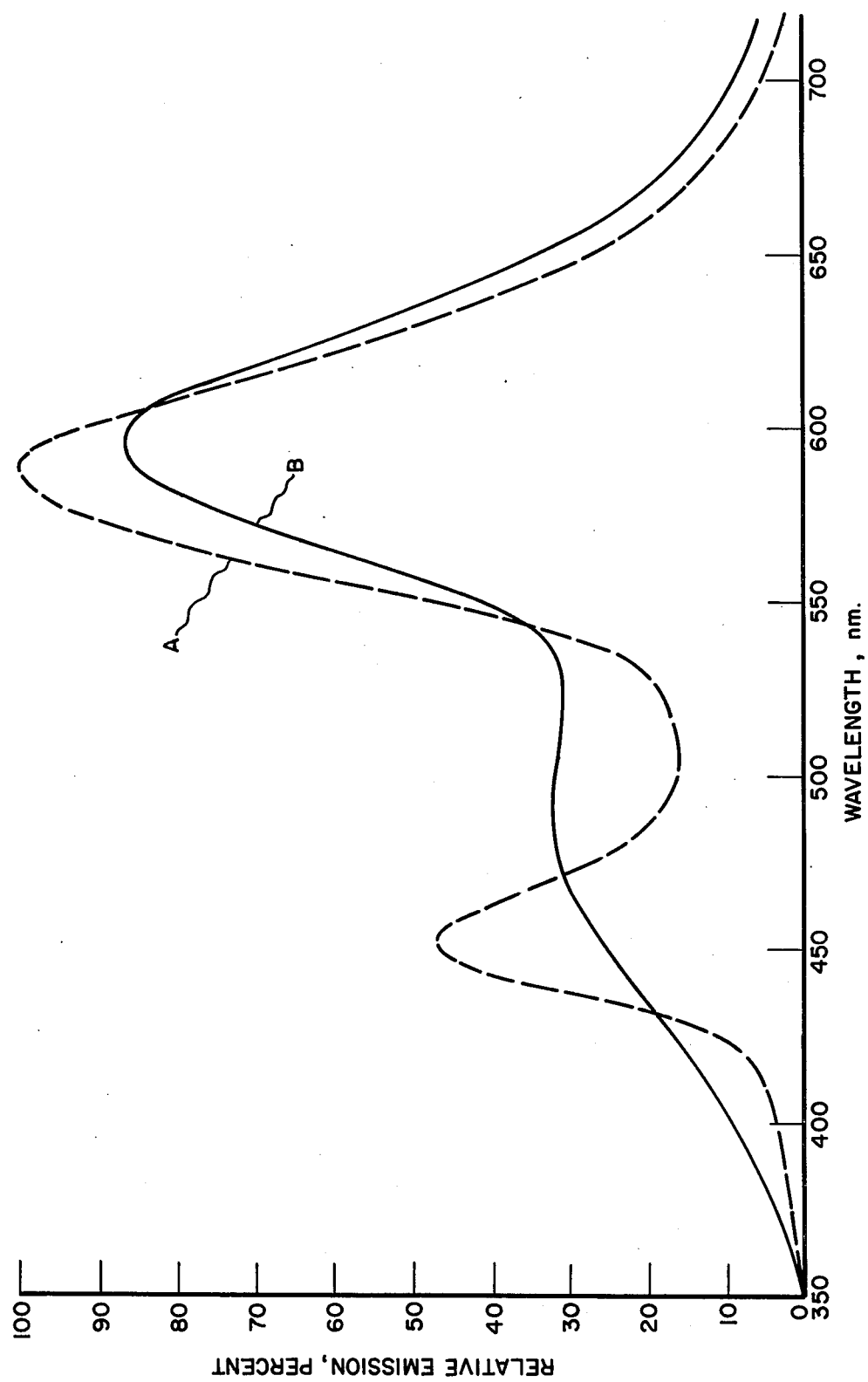

COOL-WHITE FLUORESCENT LAMP WITH PHOSPHOR HAVING MODIFIED SPECTRAL ENERGY DISTRIBUTION TO IMPROVE LUMINOSITY THEREOF

BACKGROUND OF THE INVENTION

The present invention relates to fluorescent lamps and more particularly to a novel phosphor blend having two principal phosphors, with each phosphor emitting in a different region of the visible spectrum to increase the luminous efficacy of the fluorescent lamp.

It is known to utilize halophosphate phosphors in a fluorescent lamp for generating one of a plurality of standard "white" spectral power distributions. A typical 36 watt fluorescent lamp, having a particular spectral power distribution, e.g. the so-called "cool-white" color, utilizes the halophosphate phosphors to generate approximately 2850 lumens, yielding a luminous efficacy of about 79 lumens per watt (lm/W).

Luminous efficacies of greater than 80 lm/W. have not been generally available with practical fluorescent lamp phosphors, although increased efficacy is highly desirable in this age of energy scarcity and high cost.

It is well known to those skilled in the science of colorimetry that an infinite number of spectral power distributions (SPD) exist that have identical color coordinates (Hardy, "Handbook of Colorimetry", MIT Press (1936)). Any black body radiation of specified temperature has a known SPD and, therefore, a unique set of color coordinates. The locus of such sets for all temperatures is known as the black body locus. A color temperature may be computed for any other SPD lying near the black body locus. It is also well known that a theoretical luminous efficacy (TLE) for a phosphor of known SPD, responsive to absorption of ultraviolet power of a specified wavelength, can be calculated assuming a quantum efficiency (QE) of unity. Any real phosphor has a quantum efficiency less than unity and an experimental luminous efficacy (ELE), i.e. the product of TLE and QE, less than its TLE.

Another figure of merit is the color rendering index (CRI), which measures the degree to which the perceived colors of standard color plaques illuminated with a given SPD conform to those of the same plaques illuminated by a black body radiation with the same color temperature (Wyszecki and Stiles, *Color Science*, page 470 et seq., Wiley (1967)). Light from hot radiators such as a tungsten lamp or sunlight are characterized by a CRI close to 100. Deluxe fluorescent lamps have a CRI on the order of 80–90. Standard fluorescent lamps, used for most commercial and industrial lighting, typically have a CRI on the order of 50–70.

STATE OF THE ART

It is known to utilize halophosphate phosphors activated with divalent manganese and trivalent antimony in a fluorescent lamp to generate "white" light having color coordinates on or adjacent to the black body locus. To obtain the color coordinates of standard colors such as "cool white" and "warm white", the concentration of the manganese activator ions as well as the fraction of chlorine and fluorine in the phosphor can be adjusted. It is known that the antimony activator serves two functions: emission of a relatively broad blue spectrum band of half power width on the order of 140 nanometers (nm), and efficient transfer of energy to the manganese ions present in the phosphor host lattice. The yellow emission band of the manganese ions is of the order of 80 nm wide at half maximum power and is therefore narrower than the blue emission spectrum of the antimony.

The variation of the TLE with theoretical phosphor SPDs comprised of two major phosphor emission bands has been described by MacAdam (40 *J. Op. Soc. Am.* 120 (1950)); Ivey (62 *J. Op. Soc. Am.* 814 (1972)), and Walter (10 *Appl. Optics* 1108 (1971)); while the improvement of CRI by use of phosphors having two and three major emission bands has been considered by Walter (supra) and by Thornton and Haft (2 *J. Illum. Eng. Soc.* 29 (1972)).

MacAdam initially found that the TLE for a specified color (such as "cool white") will have a maximum value if a lamp could be made to emit only at a single blue and a single yellow wavelength. Subsequently, Ivey analyzed the TLE and lamp performance for several theoretical phosphors having one or two emission bands and described how the TLE decreased for increasing width of the emission bands. Walter, having a primary objective in the optimization of a "quality index" based on a combination of TLE and CRI of a theoretical phosphor, describes various two-component theoretical phosphor blends having different bandwidths and also defined a brightness index directly related to TLE; he concluded that an optimum blend, considering both indices, has a broad blue-green band and a narrow orange-red band.

A phosphor is desired having a useful spectral power distribution and possessing an ELE greater than that of the corresponding halophosphate phosphor in a "cool-white" emitting fluorescent lamp. The desired phosphor should possess a quantum efficiency no less than 10% below that of the halophosphate phosphor presently manufactured for a specific cool white fluorescent lamp and, preferably, the quantum efficiency should differ by less than 5%. Although CRI is not of primary importance in the desired phosphor, it is recognized that a reasonable CRI must result, e.g., the MacAdam spectrum of two monochromatic lines has a CRI of −18 and would not be of practical intereset; a CRI on the order of 40–60 has been judged acceptable by competent observers.

BRIEF SUMMARY OF THE DISCLOSURE

In accordance with the invention, a novel phosphor composition for use in a fluorescent lamp of the type having an envelope of light-transmissive material filled with a low pressure mercury vapor, means for causing the mercury vapor to emit radiation quanta, and having a coating of the phosphor composition deposited upon an interior surface of the envelope for emitting quanta of visible light responsive to receipt of the radiation quanta emitted by the mercury vapor, is characterized by the coating comprising a blend of a first phosphor having a relatively narrow emission band peaking in the short visible wavelength (blue) region at a wavelength of approximately 450 nm. and a second phosphor having a relatively broad emission peaking in the 570–600 nm. (yellow) region of the visible spectrum. The yellow phosphor contributes the majority of the luminosity of the lamp with the blend ratio between first and second phosphors being adjusted by variation of the percentage (by weight) of the blue phosphor within a uniformly blended mixture of the modified-emission-spectrum two-phosphor system, to compensate for the differences in quantum efficiency and spectral emission characteristics of the phosphors in the visible region and to adjust for the visible mercury-vapor-radiation escaping through the wall of the phosphor-coated envelope. The color coordinates of the lamp spectrum are thus placed within the standard "cool-white" emission oval defined in a region around a black body radiation locus, with the yellow phosphor capturing a high percentage of the ultra-violet radiation emitted by the mercury vapor.

In one preferred embodiment realizing color coordinates in the "cool-white" emission oval, the uniformly blended composition comprises approximately 4–11% by weight of a blue strontium, europium chlorapatite (SECA) phosphor, while approximately 89–96% of the composition is a yellow phosphor of the manganese-antimony calcium fluorapatite type. This novel composition provides a 5–10% increase in luminosity relative to a standard halophosphate phosphor coating.

In other preferred embodiments, the blue phosphor may be europium-activated barium magnesium aluminate; the luminosity increase is comparable to that of the SECA phosphor, if equal quantum efficiencies are achieved.

The lumen increase provided by a phosphor in accordance with the present invention, as compared with conventional calcium halophosphate phosphors, can be characterized by an increase in the ELE. For example, the presently used halophosphate for the cool-white fluorescent lamp has an initial quantum efficiency on the order of 0.9 and an ELE of about 147 lm/watt. Due to the gas discharge efficiency of about 50%, the overall lamp efficacy is about 80 lm/watt.

The SPD and all of its specific embodiments disclosed below to be of useful purpose must of course possess an ELE greater than that of the corresponding phosphor presently used in cool-white-emitting fluorescent lamps. Therefore, the preferred embodiment of this invention hereinafter disclosed for a cool-white color must possess a quantum efficiency no less than 10% below that of the halophosphate phosphor presently manufactured for cool-white fluorescent lamps. Preferably, the quantum efficiency should differ by less than 5%. One embodiment of this invention has been measured to have an ELE of about 160 lm/watt. The preferred phosphor blend herewithin illustrated employs a mixture of a yellow phosphor and a blue phosphor which possess a TLE of about 180 lm/watt when properly blended to result in a cool white lamp.

Accordingly, it is one object of the present invention to provide a novel phosphor blend having a pair of phosphors respectively emitting in the blue and yellow portions of the visible spectrum.

It is another object of the present invention to provide novel phosphor blends facilitating adjustment of the emission color point at increased luminosity.

Still another object of the present invention is to provide a novel phosphor blend emitting within the cool-white oval at increased luminosity.

Yet another object of the present invention is to provide a novel phosphor composition facilitating adjustment of the emission color point to compensate for escaping visible mercury radiation.

These and other objects of the present invention will become apparent to those skilled in the art upon a consideration of the following detailed description and the drawings.

DESCRIPTION OF THE DRAWINGS

FIG. 4 is a spectral power distribution for the preferred blend of the present invention relative to one conventional cool-white halophosphate phosphor.

DETAILED DESCRIPTION OF THE INVENTION

Figure 1:
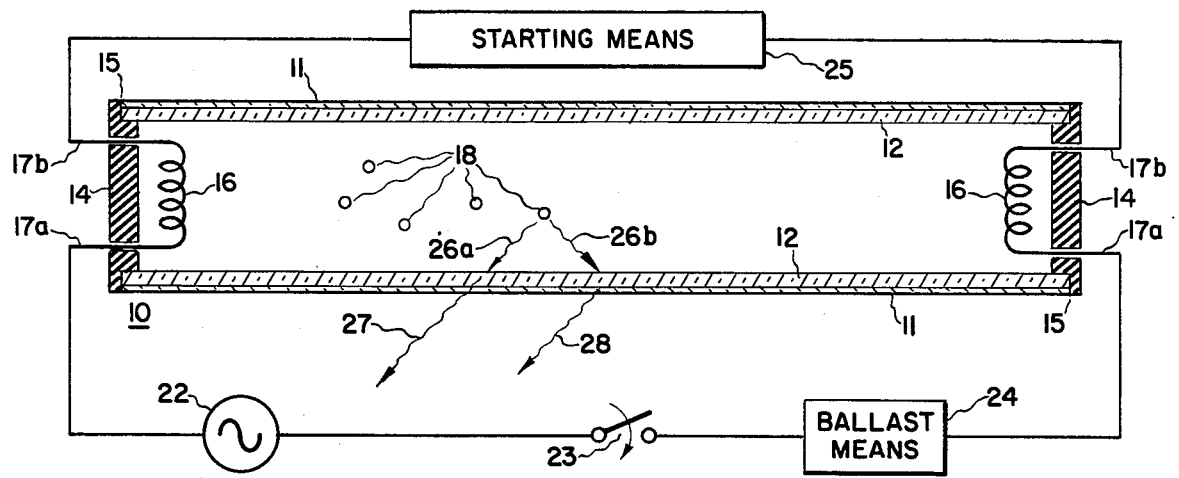
FIG. 1 is a sectional side view of a fluorescent lamp and a schematic representation of one possible circuit in which the lamp is used.

Referring to FIG. 1, a fluorescent lamp 10 comprises, in one embodiment, a cylindrical envelope 11 of light transparent material, such as glass and the like, having a coating 12 of a phosphor composition deposited upon its interior surface. An end cap 14 enclosed and forms a gas-type seal 15 at each opposite end of cylinder 11. A filament 16 is positioned adjacent to each end cap within the bore of tube 11 and includes a pair of leads 17a, 17b passing through and supported by the associated end cap 14. A quantity of mercury vapor 18 is initially deposited, at manufacture, within the cylindrical volume bounded by phosphor layer 12 and end caps 14.

A source 22 of alternating-current electrical energy, a switch 23 and ballast means 24 are in electrical series connection between a first lead 17a of each opposite filament 16. Starting means 25 is coupled between the remaining leads 17b of each of the pair of filaments 16. It should be understood that other known fluorescent lamp embodiments may be equally well utilized and may allow certain of the circuit components (such as starting means 25) to be dispensed with.

As is well known, in operation starting means 25 causes a flow of current through each of filaments 16 responsive to the closure of switch 23. Starting means 25 thereafter causes a sudden cessation of current flow to cause ballast means 24 to generate a relatively high voltage between filaments 16 to cause a flow of current to be initiated to establish a conventional mercury arc discharge. The phosphor is caused to fluoresce and re-emit a significant portion of the impinging energy as quanta 28 of visible light having spectral characteristics determined by the composition of the specific blend of the fluorescent materials utilized for the phosphor coating in the individual tube.

Figure 3:
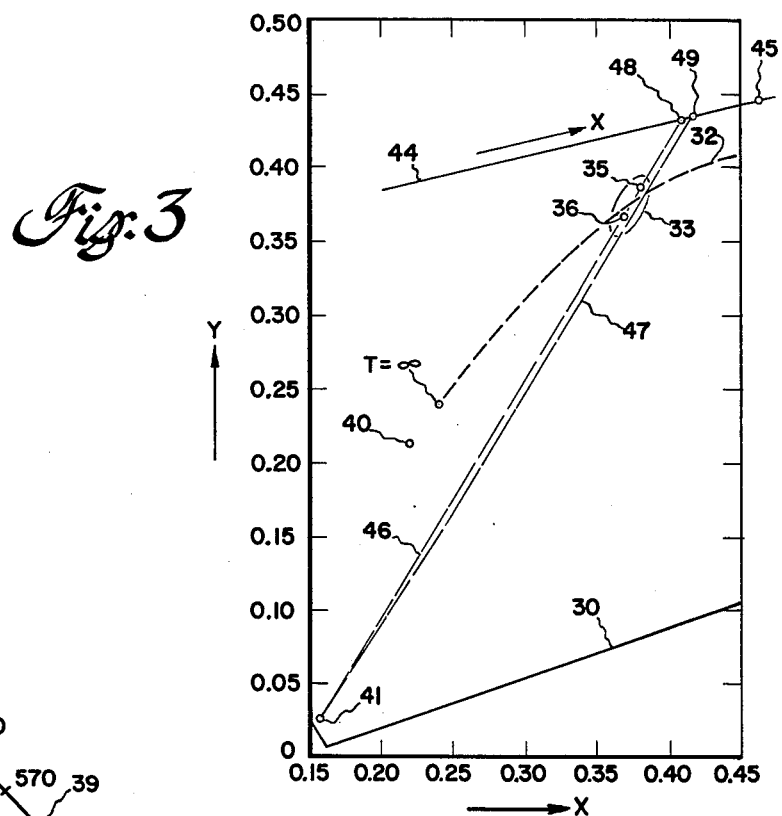
FIG. 3 is an enlarged portion of the chromaticity diagram of FIG. 2.
Figure 2:
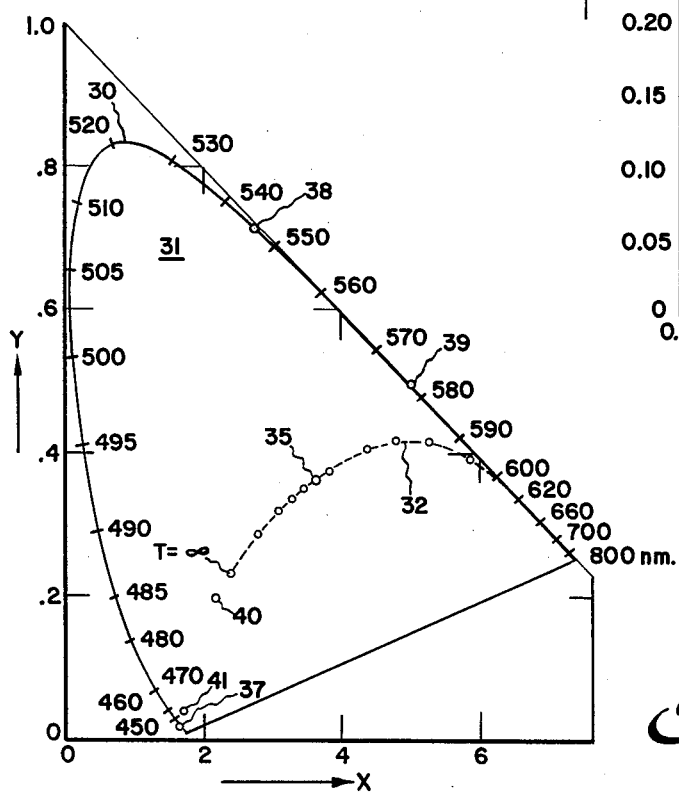
FIG. 2 is a CIE(X,Y) chromaticity diagram containing information useful in understanding the principles of the present invention.

Referring now to the chromaticity diagrams of FIGS. 2 and 3, any color of the visible spectrum is locatable within the area bounded by a spectrum locus 30 and identified by the corresponding values of the X and Y trichromaticity coordinates associated therewith. A spectrally pure color, i.e. a visible color comprised solely of a single wavelength, is located upon spectrum locus 30, whereon the spectrally pure color wavelength is indicated in nanometers of wavelength. Chroma, including white light, comprising a blend of two or more spectrally pure colors has X and Y values within area 31 bounded by spectrum locus 30. Real phosphors emit quanta at an infinite number of wavelengths. The SPD of a real phosphor is, therefore, a continuous curve from which a set of color coordinates are calculated by performing appropriate mathematical calculation (as shown, e.g., in the above-mentioned Wyszecki and Stiles text).

Curve 32 is the black body locus of color coordinates of a black body light source emitting at a designated temperature. The "cool-white" color has been standardized to a range of values situated in an oval 33 generally about a point 35 at X=0.372, Y=0.375 and corresponding to a black body temperature of approximately 4200° K. A typical cool-white lamp of known design has a color point 36 lying within oval 33 at X=0.377, Y=0.382.

In a 36 watt fluorescent lamp, approximately one watt of radiant energy is converted to produce approximately 175 lumens of visible mercury light 27. The relative magnitude of the blue mercury monochromatic emission 37, the green mercury monochromatic emission 38 and the yellow mercury monochromatic emission 39 may be combined to yield a single mercury color point 40 typically having trichromaticity coordinates substantially at X=0.22, Y=0.21.

Substantially all (18 watts) of the remaining energy emitted from mercury vapor 18 is at the mercury resonance wavelengths of approximately 185 and 254 nm., although a small amount (approximately one-half watt) is emitted at the near-ultraviolet wavelengths of 295–400 nm. The resonance energy is known to stimulate re-emission of visible light from a wide variety of phosphors. In a novel phosphor composition to be described hereinbelow, additional luminous output is obtained by the proper choice of one phosphor component of a dual phosphor blend to also partially absorb the near-ultraviolet mercury emissions for additional production of visible light. A divalent-europium-activated phosphor, i.e., a phosphor having europium as the activator ion supported in a host lattice, will partially absorb the near-ultraviolet mercury emissions substantially over the entire range of wavelengths from 297 nm. to 400 nm.

We have achieved additional luminous output by modification of the lamp output spectrum to have a relatively narrow "blue" emission band in conjunction with a relatively broader "yellow" emission band. Preferably, the activator ion emitting the relatively narrow blue spectrum is divalent europium, in contrast to a standard fluorescent tube which does not use rare-earth-doped halophosphates. A useful divalent-europium-activated phosphor will generally have a narrow emission band peaking at a wavelength of approximately 450 nm. (and will thus be a "blue" emitter) and a quantum efficiency of at least 80%, and preferably about 90%, with the quantum efficiency being dependent upon processing considerations. Preferably, the activator ion emitting the broader yellow band is divalent manganese. A phosphor dominated by manganese in a halophosphate lattice will generally have the color point of its emission at coordinates above the black body locus. Thus, an important function of the "blue" phosphor is to pull the composite color coordinates onto the black body locus; a narrow band near the peak of the Z tristimulus value efficiently performs this function while facilitating the use of a greater proportion of the incident radiation in the more highly luminous manganese emission.

In particular, we have found that a fluorescent lamp having its color point situated within the cool-white oval 33 and utilizing a divalent-europium-activated phosphor requires at least one additional phosphor component with the composite peak wavelength thereof lying in the range between 570 nm. and 600 nm. Processing costs are minimal if a single additional phosphor is utilized. Additionally, use of a two-phosphor blend allows simplified placement of the blend point within oval 33. By restricting the light below a wavelength of 520 nm. substantially to the narrow blue band essentially peaked at about 450 nm., an acceptable color rendition index can be achieved with high luminous efficacy, if the second phosphor broadly emits over a band centered in the "yellow" portion of the visible spectrum. A suitable broad yellow emission spectrum is obtained from a second phosphor having a divalent manganese activator ion supported within its host lattice.

A stoichiometric strontium, europium chlorapatite (SECA) phosphor having the chemical formula $Sr_{10-z}Eu_z(PO_4)_6Cl_2$, where $0.02 \leq z \leq 0.2$, may be utilized for the blue emitter. In particular, for achieving the cool-white oval 33, $z = 0.14 \pm 0.05$ is a preferred utilization range. The blue-emitting SECA compound has a color point 41 having trichromatic coordinates X = 0.152, Y = 0.027. Alternatively, a stoichiometric europium-activated barium magnesium aluminate having the chemical formula

$$Ba_{2-z}Eu_zMg_2Al_{22}O_{37},$$

where $0.1 \leq z \leq 0.4$, and having substantially the same trichromatic coordinates as the SECA compound, may be utilized.

As previously mentioned, most of the excitation energy is utilized to stimulate the relatively broad yellow emission band of the divalent manganese, which broad-band emission has a considerably higher total luminous flux relative to the total luminous flux contained in the shorter wavelength "blue" emission band. The increased luminous flux output of the yellow-emitting phosphor provides the improvement in total luminous flux, while the relatively low luminous flux of the blue-emitting phosphor both adds to the total luminous flux and more importantly serves to "pull" the yellow spectrum to the desired lamp emission coordinates, as hereinbelow more fully explained.

We have found that a suitable broad "yellow" emitting phosphor is a stoichiometric divalent-manganese-activated compound having the chemical formula $Ca_{10-w-x-y}Cd_wMn_xSb_y(PO_4)_6F_{2-y}O_y$, where $0.0 \leq w \leq 0.2$, $0.25 \leq x \leq 0.5$, and $0.02 \leq y \leq 0.2$. In particular, for achieving the cool-white oval 33, $w$ $w$ $0.10 \pm 0.03$, $x = 0.32 \pm 0.03$, and $y = 0.07 \pm 0.02$ are preferred ranges of $w$, $x$, and $y$, respectively. The particular manganese-activated calcium fluorapatite phosphor set forth above is advantageous in that its peak wavelength is in the region of 570–600 nm.; the utilization of a substantial mol fraction of manganese in the phosphor not only serves to quench the antimony emission, but also serves to provide a luminosity output, which, when blended with the SECA phosphor (as described hereinbelow), provides approximately 90% of the total luminous output, whereby the relatively low luminance of the narrow blue emission spectrum not only increases the available luminosity but also provides remarkably good fleshtone rendition with the broad yellow emission phosphor even though the color rendition index of the composition is approximately 50 and therefore approximately 15 points lower than the standard cool-white halophosphate fluorescent phosphor blend.

The use of a pair of phosphors, each containing a different activator ion within its lattice, is convenient from the standpoint of processing considerations, whereby the mol fraction of each activator atom (preferably being divalent europium for the narrow blue emitter and divalent manganese for the yellow emitter) can be adjusted.

We have found that the mol fraction of manganese must be adjusted, typically towards the pure manganese emission level, to obtain the desired color point in cool-white oval 33, to shift the operating slope of the blue-yellow blend line of the phosphor coating. Illustratively, to match the cool-white oval 33, as the mol fraction of manganese is increased, the trichromatic coefficients (for the yellow manganese-activated calcium fluorapatite) lie along line 44 (FIG. 3) and increase in the direction of arrow X, towards the pure manganese color point 45. The trichromatic coefficients along line 44 include the effect of the visible mercury emission lines thereon. Thus, blend line 46 is established for the visible output of a two-phosphor system utilizing the blue SECA phosphor (having color point 41) to provide the first activator ion and the yellow calcium phosphor to provide the second activator ion. In particular, a yellow phosphor having a manganese content of 3.00%, and having trichromatic coordinates $X = 0.409$, $Y = 0.432$, when solely present without the SECA compound but including the visible mercury emissions effect, establishes blend line 46 while blend line 47 is established for the same compounds, but with manganese present in the yellow calcium phosphor in the amount of 3.25%, the yellow phosphor then having trichromatic coordinates 49 with $X = 0.443$, $Y = 0.466$, when the yellow calcium phosphor is solely considered (without the SECA phosphor) but combined with the visible mercury radiation.

As can be seen from FIG. 3, a range of blend values can be found along either blend line 46 or 47 whereby the color prints of a blend fall within the desired cool-white oval 33. Typically, the proper blend requires an amount of the blue SECA compound of approximately 6% by weight of the total phosphor composition, which composition hence contains approximately 94% by weight of the yellow calcium fluorapatite compound. The "blue" phosphor can represent 4–11% by weight of the total phosphor composition, to attain a selected one a plurality of different color prints. The illustrated cool-white oval may be attained by adjusting the blending proportion along either blend line to obtain the ratio of blue-to-yellow luminosity outputs which compensate for the difference in the relative quantum efficiencies between the two phosphors and for their differing spectral emission characteristics. In general, the desired luminosity output, with improved luminous efficacy and adequate color rendition, may be obtained, for a pair of "blue" and "yellow" phosphors and for the cool-white objective point, when the "yellow" phosphor captures approximately 91% of the monochromatic radiation emitted at the approximately 254 nm. wavelength of mercury vapor 18. As hereinabove implied, the mol fraction of the divalent manganese in the yellow phosphor must be adjusted, within the preferred limits of 2.9–3.5%, to color-compensate the broad yellow emission of the phosphor composition into cool-white oval 33 for the differing levels of visible mercury radiation escaping through phosphor coating 12 and the transparent material 11 of the fluorescent tube; a greater magnitude of escaping visible mercury radiation will require that the mol fraction of manganese be greater along phosphor line 44 in the direction of arrow X and toward the pure manganese emission at point 45, while reduction of the visible mercury radiation magnitude escaping through the wall of fluorescent lamp 10 will require that the phosphor host lattice be activated by a somewhat lower mol fraction of divalent manganese.

Further understanding of the increased luminous efficacy which is gained with the present phosphor combination as compared with conventional cool-white phosphor emission is provided with FIG. 4. The relative emission curves for both phosphor materials are shown wherein the present phosphor combination (curve A) being illustrated constitutes a blend having approximately 6% by weight of the preferred europium-activated strontium chloroapatite phosphor above described mixed with approximately 94% by weight of the above described preferred calcium fluoroapatite phosphor activated with manganese and antimony. As can be noted from the emission curves, the spectral differences for the present blend are increased emission in the 530–610 nm. wavelength region accompanied by decreased emission in the 470–530 nm. region as well as in the 350–430 nm. wavelength region relative to the conventional phosphor (curve B). Such emission transfer to the more luminous 530–610 nm. wavelength region produces the desired increase in luminous efficacy compared with the cool-white emission obtained with conventional calcium halophosphate phosphor. It will also be apparent from the foregoing considerations that the narrow blue emission peaking at approximately 450 nm. wavelength which is attributable to the blue phosphor component in the present blend concentrates additional power near the peak of the Z tristimulus coordinate. Thus, the necessary value of Z is attained with less total blue power in the spectrum by using a narrow blue band. The excess power can then be used in the yellow band to further enhance the overall luminosity of this spectral power distribution. The desired lumen gain is achieved in this manner when the phosphor blend contains approximately 4–11 weight percent of the blue phosphor component and with the desired color point of composite emission being maintained in the cool-white oval.

In practice, several fluorescent lamps 10, identical in construction with a known 36 watt fluorescent lamp utilizing known halophosphate phosphors, which produce, as hereinabove mentioned, an output of 2850 lumens at a luminous efficacy of 79 lm/W., were fabricated and coated with the abovedescribed blend of the europium-activated strontium chlorapatite and the manganese-activated calcium fluorapatite. A first lamp utilizes the yellow calcium phosphor having a 3.00% manganese content, while second and third lamps utilize the yellow calcium phosphor with 3.25% manganese content; all three compositions having 6% or 7%, by weight, of the blue europium-activated strontium chlorapatite compound in a total phosphor blend. The 100 hour burning results obtained with our novel two-phosphor blend, particularly synthesized to emit within the standard cool-white oval, are summarized in the following table and illustrate the increased luminous output at an increased value of luminous efficacy (in lumens per watt) with the percentage gain of our novel two-phosphor blend being particularly set forth with reference to a standard cool-white halophosphate blend.

| Lamp | 1 (RAP 17) | 2 (RAP 36) | 3 (RAP 40) |
|---|---|---|---|
| %Mn= | 3.00% | 3.25% | 3.25% |
| L | 3055 | 3005 | 3069 |
| lm/W | 84.9 | 83.5 | 85.3 |
| Gain (% over 79 lm/W) | 7.4% | 5.4% | 7.9% |
| Trichromatic Coordinates, (X,Y) | 0.372 0.381 | 0.375 0.381 | 0.379 0.383 |
| % SECA | 6% | 7% | 6% |

There has just been described a novel phosphor blend having one phosphor emitting a relatively broad band of visible light in the yellow portion of the visible light spectrum and the other phosphor emitting a relatively narrow band of visible light in the blue portion of the visible light spectrum to realize a phosphor coating for a fluorescent lamp having an improved luminous efficacy. In particular, a novel two-phosphor blend for use in a cool-white emitting fluorescent lamp comprises approximately 4–11% by weight of a first phosphor having its narrow emission band in the "blue" region of the visible spectrum peaking around 450 nm. with the remainder (89–96% by weight) of the blend comprising a second phosphor having its relatively broad emission spectrum in the "yellow" region of the visible spectrum and peaking at about 570–600 nm., with the two phosphors yielding a 5–10% increase in luminous efficacy compared to presently used lamp phosphors.

While several preferred embodiments of the two-activator-ion system have been described, many variations and modifications will now occur to those skilled in the art. It is our intention, therefore, to be limited not by the present disclosure, but solely by the appended claims.

The subject matter which we claim as novel and desire to secure by Letters Patent of the United States is:

1. In a fluorescent lamp of the type having a sealed envelope enclosing means to generate a low-pressure mercury discharge within said envelope, and a coating contained within said envelope for conversion of at least a portion of the radiation emitted from said discharge to visible light having a white color, the improved coating comprising:

a first phosphor having a relatively broad emission spectrum with a mean wavelength in a yellow portion of the visible spectrum, wherein said first phosphor is $Ca_{10-w-x-y}Cd_wMn_xSb_y(PO_4)_6F_{2-y}O_y$ where $w$ is in the approximate range 0.0–0.2, $x$ is in the approximate range 0.25–0.50 and $y$ is in the approximate range 0.02–0.2;

a second phosphor having a relatively narrow emission spectrum in a blue portion of the visible spectrum;

said first and second phosphors being uniformly blended together in a porportional relationship preselected to provide increased luminous efficacy for said mixture.

2. The improved coating of claim 1, wherein said second phosphor is $Sr_{10-z}Eu_z(PO_4)_6Cl_2$ wherein $z$ is in the approximate range 0.02–0.2.

3. The improved coating of claim 2, wherein said coating contains a quantity of said second phosphor sufficient to match the emission spectra of said first phosphor to a cool white color point having trichromatic coordinates of approximately $X=0.377$, $Y=0.382$.

4. The improved coating of claim 3, wherein the mol fraction of manganese in said first phosphor is varied to achieve said cool-white color point.

5. The improved coating of claim 3, wherein said second phosphor is in the range of 4–11% by weight of said coating, said first phosphor being in the range of 89–96% by weight of said coating.

6. The improved coating of claim 5, wherein said second phosphor is approximately 6% by weight of said coating, said first phosphor being approximately 94% by weight of said coating.

7. The improved coating of claim 3, wherein $w=0.10 \pm 0.03$, $x=0.32 \pm 0.03$, $y=0.07 \pm 0.02$ and $z=0.14 \pm 0.05$.

8. The improved coating of claim 1, wherein said second phosphor is $Ba_{1-z}Eu_zMg_2Al_{22}O_{37}$ wherein $z$ is in the approximate range 0.1–0.4, said second phosphor having a peak emission of approximately 450 nanometers.

* * * * *